United States Patent
Burton

[15] 3,648,564
[45] Mar. 14, 1972

[54] HYDRAULIC FLUIDIC SERVOACTUATORS

[72] Inventor: Robert V. Burton, Minneapolis, Minn.
[73] Assignee: Honeywell Inc., Minneapolis, Minn.
[22] Filed: Apr. 3, 1970
[21] Appl. No.: 25,406

[52] U.S. Cl..................................................91/3, 91/388
[51] Int. Cl..............................F15b 13/042, F15b 13/16
[58] Field of Search...................................91/388, 3

[56] References Cited

UNITED STATES PATENTS

| | | |
|---|---|---|
| 3,485,140 | 12/1969 | Granon et al.............................91/388 |
| 3,494,257 | 2/1970 | Welk, Jr. et al..........................91/388 |
| 3,515,030 | 6/1970 | Boothe....................................91/388 |

FOREIGN PATENTS OR APPLICATIONS 721,373   6/1942   Germany.......................................91/3

*Primary Examiner*—Paul E. Maslousky
*Attorney*—Charles J. Ungemach and Ronald T. Reiling

[57] ABSTRACT

A closed loop hydraulic fluidic servoactuator employing a high pressure proportional fluid amplifier as a single stage control valve. Also disclosed are lagged feedback and lead lagged feedback circuits employed in the servoactuator.

1 Claim, 4 Drawing Figures

INVENTOR.
ROBERT V. BURTON
BY Charles J. Ungemach
ATTORNEY

INVENTOR.
ROBERT V. BURTON
BY Charles G. Ungemach
ATTORNEY

HYDRAULIC FLUIDIC SERVOACTUATORS

BACKGROUND OF THE INVENTION

This invention relates to position control systems, and more particularly to a servoactuator employing a fluid amplifier as a single stage control valve.

Fluid devices have been used in control systems such as autopilots, engine controls, process controls, and the like. They offer the advantages of simplicity, economy, ruggedness, and the ability to operate in high temperature or high vibration environments hostile to electronic control systems.

More recent developments in fluidic controls for aircraft stability augmentation, aircraft flight controls, and mobile equipment and machinery controls have identified the need for a low-cost reliable servoactuator compatible with the fluid control systems. That servoactuator must be capable of high pressure operation to enable a low pressure fluid control signal to be translated directly to a high power actuator response without the need for electrical or mechanical interfaces between the fluidic control system and the hydraulic actuator and at the same time maintain the simplicity and reliability demanded by many control applications.

Most prior art systems meet these requirements with only moderate success using precision sliding spool valves. These moving spool valves involve, however, increased initial expense, decreased system reliability, and shorter system lifetime. They are inherently subject to friction effects and seizure due to the close tolerance moving parts and are susceptible to silting by contaminated fluid. Typically, a fluidic control signal having a pressure of 5 to 10 p.s.i. must control a hydraulic actuator operating at several thousand p.s.i. Prior schemes using no moving spool valves deny this high gain or the time and dynamic response necessary for many control functions. Lazar U.S. Pat. No. 3,468,220 entitled Control Systems, assigned to the present assignee, is representative of more recent attempts to eliminate spool valves. That system, while achieving satisfactory time response, nevertheless denies the high gain required for many control applications.

Most prior art systems require precision levers and springs to provide a mechanical negative feedback. Not only are these levers and springs subject to wear and friction, but additionally they are subject to acceleration and vibration errors and linkage backlash. Adjusting the feedback gain or adding phase lag or phase advance to the mechanical feedback usually requires major linkage changes and additional levers and dashpots, resulting in a more complex and even less reliable feedback system.

BRIEF SUMMARY OF THE INVENTION

The instant invention provides a proportional servoactuator overcoming these weaknesses of prior art servoactuators.

A summing means controls a proportional fluid amplifier means which serves as a single stage control valve. The fluid amplifier means output in turn positions the piston in a typical piston-cylinder actuator. The system includes negative feedback means for supplying a fluidic feedback signal to the summing means to stabilize the actuator at a position proportional to an input position command signal at the summing means. A first embodiment employs a pair of bellows acting on a force balance beam in a flex valve as the summing means; a second embodiment uses a summing amplifier as the summing means. Also disclosed are lagged and lead lagged feedback circuits as might be employed in the servoactuator in certain control applications demanding frequency responsive feedback.

The servoactuator allows low pressure fluid control signals to be translated directly to high power actuator response. This is done without resorting to spool valves or other expensive precision moving parts.

Since the fluid amplifier is a continuous flow device using fixed porting areas, utilizing fluid amplifiers in place of spool valves overcomes or eliminates several weaknesses of the prior art, including friction effects, seizure, and silting. In addition, the amplifier output is inherently proportional to an input signal, so no inner feedback is necessary for servoactuator applications.

A fluidic feedback arrangement further abates defects characteristic of prior art mechanical feedback schemes. The fluidic feedback design eliminates the system of levers and springs, and so is not vulnerable to acceleration, vibration, or backlash induced errors. Adjustments such as feedback phase advance or phase lag compensation are easily accomplished by adding fluidic resistor-capacitor networks to the fluid circuit. These elements, like other fluidic elements, are rugged, inexpensive, and highly reliable, so the effectiveness of the system is in no way impaired by their addition.

The system disclosed is therefore inexpensive to construct, highly reliable, and offers long operating lifetime. It is essentially maintainence-free and is compatible with many fluidic control systems in a multitude of control applications.

DESCRIPTION OF THE PREFERRED EMBODIMENT

Figure 1:
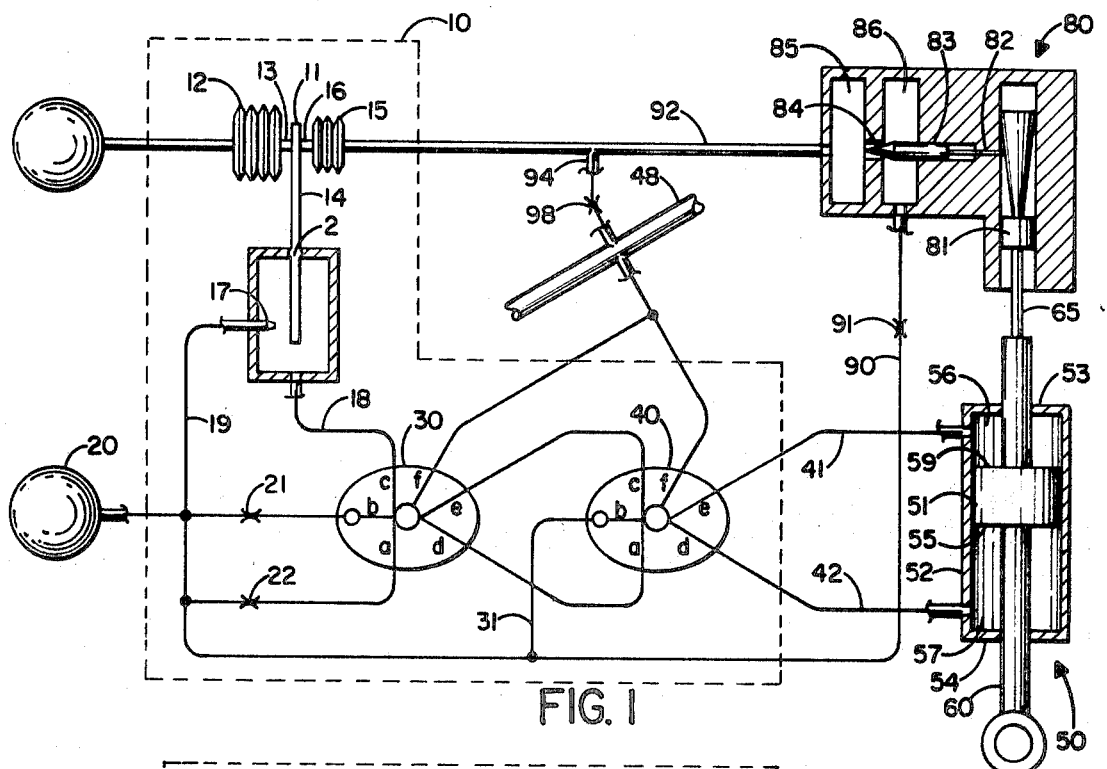
FIG. 1 schematically illustrates a first embodiment of my servoactuator.

A preferred embodiment illustrated in FIG. 1 comprises three basic elements: a fluidic servovalve 10, an actuator 50, and a follow-up valve assembly 80.

The fluidic servovalve 10 comprises a summing means 11 including an input bellows 12 for accepting a fluidic position command input signal. Input bellows 12 is connected by a rigid member 13 to a force balance beam 14. Force balance beam 14 is mounted to pivot about an axis 2 perpendicular to the plane of FIG. 1. Opposite input bellows 12 is a feedback bellows 15 connected to the force balance beam 14 by a second rigid member 16. The net signal at input bellows 12 and feedback bellows 15 determines the position of force balance beam 14 relative to a nozzle 17, thereby controlling the flow of fluid under pressure from a high pressure fluid source 20 via a conduit 19 through nozzle 17. High pressure fluid source 20 provides hydraulic fluid, oil, or other noncompressible fluid. Fluid under pressure in a volume rate proportional to the net signal at input bellows 12 and feedback bellows 15 exhausts through a valve output 18.

This fluid signal is then communicated to a control port 30c of a proportional fluid amplifier 30. The high pressure fluid source 20 is connected by a fluid resistor means 21 to the power nozzle 30b of fluid amplifier 30. A second fluid resistor means 22 connects high pressure fluid source 20 to control port 30a of fluid amplifier 30. Fluid amplifier 30 is cascaded with a second proportional fluid amplifier 40 by communicating outlet passage 30d with control port 40a and outlet passage 30e with control port 40c. A conduit 31 permits high pressure flow from high pressure fluid source 20 to power nozzle 40b.

Fluid amplifiers 30 and 40 are of the type disclosed in my U.S. Pat. No. 3,261,372, entitled Fluid Control Element, assigned to the present assignee. These amplifiers employ an isolation chamber between the fluid interaction region and the outlet passages. A return passage from each such isolation chamber exhausts excess fluid that might otherwise be reflected back from the amplifier output to the interaction region. In FIG. 1 the return passages 30f and 40f exhaust excess fluid from amplifiers 30 and 40 respectively. It is this feature that allows the amplifiers to operate at pressures of several thousand p.s.i. Return passage 30f and 40f join a common return pipe 48 which carries excess fluid to a sump or to the input of the high pressure fluid source 20 or otherwise disposes of the fluid.

The actuator 50 includes a piston 51 whose position is to be controlled. Piston 51 is shown contained in a generally cylindrical housing 52 having ends 53 and 54 respectively. Housing 52 together with a face 59 of piston 51 and end 53 defines a first chamber 56; similarly, housing 52, end 54, and the second face 55 of piston 51 define a second chamber 57. A conduit 41 connects amplifier outlet passage 40e to chamber 56, and a conduit 42 connects amplifier outlet passage 40d to chamber 57. Piston 51 is caused to slide in housing 52 by means of a fluid differential signal supplied to chambers 56 and 57. Attached to piston 51 is a control rod 60 which passes in a slidably sealed relation through the ends 53 and 54 of housing 52. Control rod 60 guides the travel of piston 51 within housing 52 and maintains the piston-cylinder configuration. The lower portion of control rod 60 is shown having a ring shaped end which may be connected to the apparatus to be controlled, for example, an aircraft control surface.

Connected to the upper portion of control rod 60 is a connecting member 65 which operates follow-up valve assembly 80 to provide a feedback signal proportional to the position of control rod 60. The follow-up valve shown includes a tapered sliding cam 81 and a cam follower 82 which is restrained for horizontal movement corresponding to vertical motion of sliding cam 81. A needle valve 83 is connected to cam follower 82 and cooperates with an orifice 84 to allow a flow of fluid from high pressure fluid source 20 through a conduit 90 including a resistor means 91 into a valve chamber 86, through orifice 84 and plenum chamber 85, and into a conduit 92. Conduit 92 communicates this fluid flow feedback signal determined by the position of control rod 60 to feedback bellows 15. Between conduit 92 and return pipe 48 is a conduit 94 including a resistor 98. Resistor 98 maintains a working pressure in conduit 92 so that a feedback signal from follow-up valve 80 will operate feedback bellows 15 rather than merely escape to return pipe 48.

To review the operation of this embodiment, consider first a fluidic position command signal which expands input bellows 12. This expansion causes force balance beam 14 to rotate clockwise about axis 2, in turn causing its lower end to move to the left toward nozzle 17, thereby reducing the flow of fluid to fluid amplifier control port 30c. This would cause more fluid to exhaust through outlet passage 30e. This signal is communicated to fluid amplifier control port 40c, causing more fluid to exhaust through outlet passage 40d. This signal is conveyed through conduit 42 to chamber 57, causing piston 51 and consequently control rod 60 to move upward. This motion is mechanically communicated to follow-up valve 80 by connecting member 65, causing sliding cam 81 to move upward simultaneously with piston 51. Needle valve 83, resting on cam follower 82, moves away from orifice 84, allowing more fluid to pass through plenum chamber 85 and conduit 92 to feedback bellows 15, thus obtaining the desired negative feedback characteristic which stabilizes control rod 60 at a position proportional to the position command signal presented to input bellows 12.

The operation in response to a position command signal of the opposite sense, that is, a signal tending to contract input bellows 12, would parallel the above operation to move control rod 60 downward. The feedback signal would now cause feedback bellows 15 to contract, again resulting in the desired negative feedback.

Figure 2:
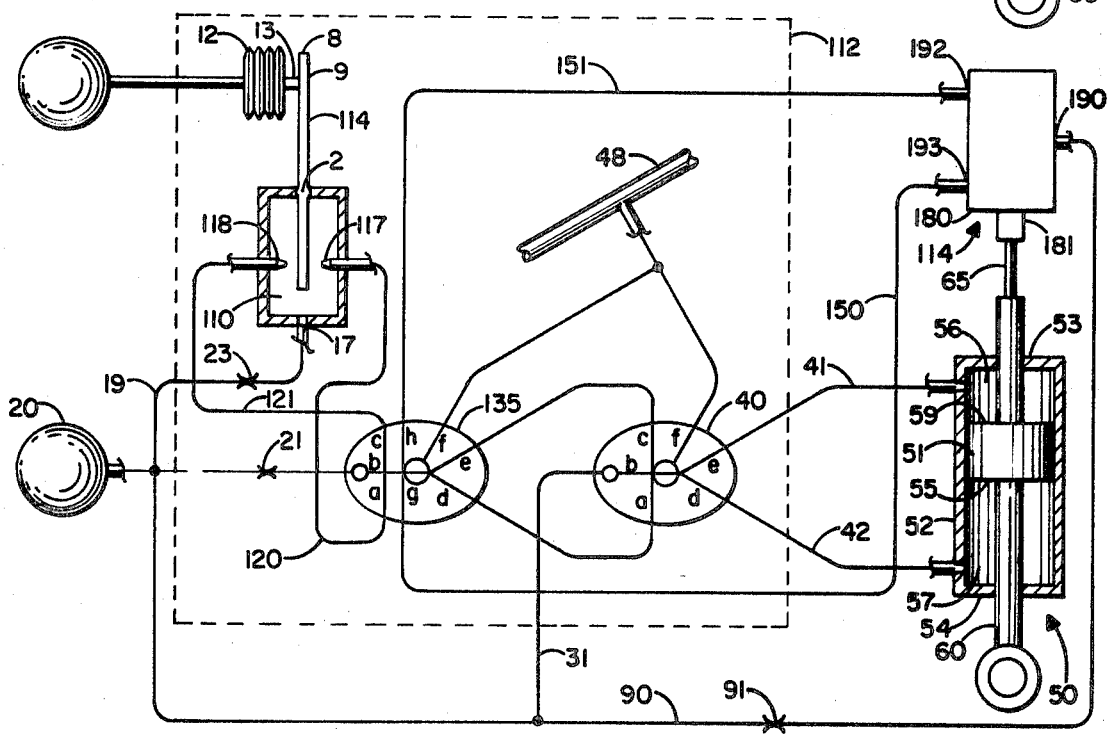
FIG. 2 similarly illustrates an alternate embodiment of my servoactuator.

A second embodiment is shown in FIG. 2, in which like numbers indicate elements similar to those of FIG. 1. In this flow feedback version, the bellows summing means is omitted. Instead, amplifier 30 is replaced by a summing amplifier 135. Like amplifier 30, summing amplifier 135 employs an isolation chamber and return passage between its interaction region and output passages to exhaust excess fluid which might otherwise reflect from the output to the interaction region.

Referring to FIG. 2, the servoactuator again comprises three basic elements: a fluidic servovalve 112, an actuator 50, and a feedback transducer 114. An input bellows 12 for accepting a fluidic position command input signal is connected by a rigid member 13 to control a flex valve 8. Flex valve 8 includes a force beam 114 movable about a pivot 2 according to the net force applied at its input end 9. A conduit 19 including a fluid resistor 23 passes fluid from a high pressure fluid source 20 to a fluid input 17 of flex valve 8. Flex valve 8 further includes a chamber 110 in which two nozzles 117 and 118 are affixed opposite each other with force beam 114 extending between the two nozzles. Thus, rotation of force beam 114 about pivot 2 determines the differential flow through the two nozzles 117 and 118. Nozzle 117 is connected to an input control port 135a of summing amplifier 135 by a conduit 120; nozzle 118 is connected to the other input control port 135c by a conduit 121. The output of summing amplifier 135 is connected to the input control ports of amplifier 40 in the same manner as that described in FIG. 1. Likewise as in FIG. 1 the interaction regions of the amplifiers are connected to the common return pipe 48 and the conduits 41 and 42 again connect the outlet passages of amplifier 40 to chambers 56 and 57 of actuator 50. The elements of actuator 50 are similar to corresponding elements in the first embodiment.

In order to provide a fluid feedback signal, control rod 60 is connected by connecting member 65 to a movable member 181 of a fluidic flow feedback transducer 114. The feedback transducer 114 accepts fluid under pressure at fluid input 190 and produces a differential fluid output signal at output ports 192 and 193 indicative of the position of movable member 181 within a housing 190, movable member 181 moving simultaneously with movement of control rod 60. Feedback transducer 114 could, for example, be similar to the fluid potentiometer employed in the apparatus disclosed in the aforementioned Lazar U.S. Pat. No. 3,468,220. Fluid under pressure flows from high pressure fluid source 20 through conduit 90 including resistor 91 to the fluid input 190 of feedback transducer 114. Output port 192 is connected by a conduit 151 to a feedback control port 135h of summing amplifier 135; output port 193 is similarly connected by a conduit 150 to a feedback control port 135g of summing amplifier 135.

The operation of this second embodiment is similar to the operation of the first embodiment except that the position of control rod 60 now determines the position of movable member 181 to provide a differential fluid feedback signal at output ports 192 and 193 and this differential signal is communicated to control ports 135g and 135h of summing amplifier 135 to provide the desired negative feedback.

Referring to FIG. 2, consider a fluidic position command signal which expands input bellows 12. This expansion causes force beam 114 to rotate clockwise about axis 2, in turn causing the lower end of force beam 114 to move away from nozzle 117 toward nozzle 118, allowing more fluid to exhaust through nozzle 117 while decreasing the fluid flow through nozzle 118. The two fluid signals are communicated to input control ports 135a and 135c of amplifier 135 by conduits 120 and 121 respectively, causing more fluid to exhaust through outlet passage 135e. This signal is communicated to fluid amplifier control port 40c, causing more fluid to exhaust through outlet passage 40d. This signal is conveyed through conduit 42 to chamber 57, causing piston 51 and control rod 60 to move upward. This motion is mechanically communicated to feedback transducer 114 by connecting member 65. Feedback transducer 114 operates as previously explained to produce a differential feedback signal. The upward movement of piston 51, control rod 60, connecting member 65, and movable member 181 would increase the amount of fluid exhausting through output port 192 while decreasing the flow through output port 193. This differential fluid signal is conveyed through conduits 150 and 151 to feedback control ports 135g and 135h of summing amplifier 135. The increased fluid flow through feedback control port 135h and decreased flow through feedback control port 135g would increase the fluid flow through output passage 135d, thus increasing flow to control port 40a, through output passage 40e, and conduit 41 to chamber 56, providing the negative feedback required to stabilize control rod 60 at a position proportional to the position command signal at input bellows 12.

The operation in response to a position command signal contracting input bellows 12 would parallel the above operation to move piston 51 and control rod 60 downward. Feedback transducer 114 would then produce a differential feedback signal resulting in increased flow through output port 193 and conduit 150 to feedback control port 135g and decreased flow through output port 192 and conduit 151 to feedback control port 135h, again obtaining the desired negative feedback characteristic.

Particular control applications may require lagged or lead lag feedback. Since the instant invention provides a fluidic feedback signal, fluidic resistor-capacitor networks can be added to provide frequency sensitivity.

Figure 3:
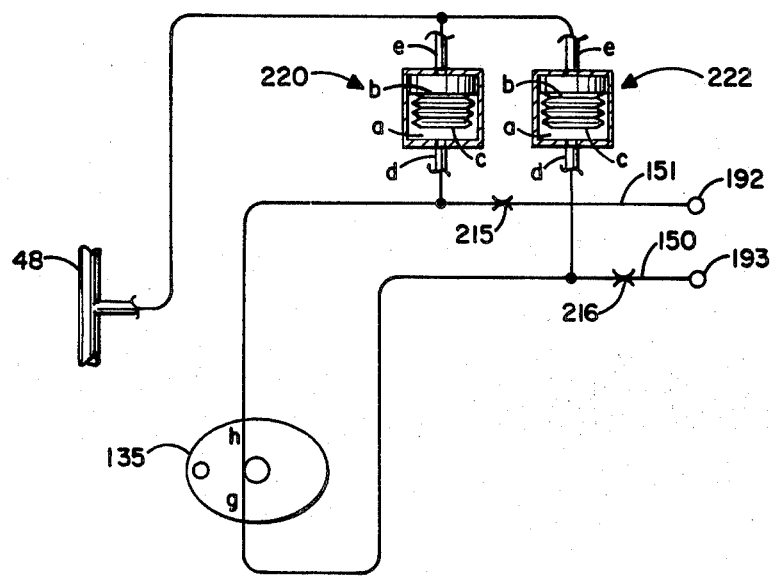
FIG. 3 schematically illustrates a lagged feedback circuit as might be employed in the apparatus of FIG. 2.

FIG. 3 shows a lagged feedback circuit as might be employed in the servoactuator of FIG. 2. Referring to FIG. 3, a first bellows capacitor 220 is connected between conduit 151 and return pipe 48, and a second bellows capacitor 222 is similarly connected between conduit 150 and return pipe 48. Capacitor 220 is of the type having a first chamber 220a and a second chamber 220b separated by an expandable bellows 220c. Bellows 220c may expand or contract in response to a pressure differential between chamber 220a and chamber 220b, but does not allow fluid flow directly from chamber 220a to chamber 220b. Bellows 220c would have an equilibrium position in response to a pressure differential between chambers 220a and 220b determined by its elasticity. A pair of conduits 220d and 220e connects the capacitor 220 to the feedback circuit. In the instant case, conduit 220d connects chamber 220a with conduit 151, while conduit 220e connects chamber 220b to return pipe 48. The second capacitor 222 is connected to conduit 150 by a conduit 222d and to return pipe 48 by a conduit 222e. Capacitor 222 is similar, or in most cases identical to capacitor 220. The capacitance of a bellows capacitor such as capacitor 220 is determined by the volumes of chambers 220a and 220b, and the elasticity of bellows 220c. The capacitance employed will depend on the particular control application anticipated.

A first fluid resistor 215 is added to conduit 151 between transducer output port 192 and the junction of conduits 220d and 151. A second fluid resistor 216 is introduced into conduit 150 between transducer output port 193 and the junction of conduits 222d and 150.

In operation, this fluidic circuit performs much as its electrical counterpart, a low-pass filter. Consider for example a step function feedback signal in the sense of increased fluid flow through transducer output port 192 and decreased flow through transducer output port 193. The first surge of fluid through conduit 151 will be retarded by resistor 215. The flow will charge capacitor 220 by filling chamber 220a until bellows 220c is contracted to an equilibrium position where its elasticity prevents further contraction. A steady state flow through conduit 151 will now be obtained. That is, the entire fluid output from transducer output port 192 will flow through conduit 151 to feedback control port 135h, undergoing a pressure drop only across resistor 215 according to the resistance of that resistor. While bellows 220c was contracting, bellows 222c was expanding as fluid flowed from chamber 222a through conduits 222d and 150 to amplifier feedback control port 135g. These operations, occurring simultaneously, cause the high frequency impulse of a step feedback signal to be passed to return pipe 48 while allowing a low frequency feedback signal to pass through resistors 214 and 216 to feedback control ports 135g and 135h of summing amplifier 135, thus providing the desired feedback lag or low-pass.

Figure 4:
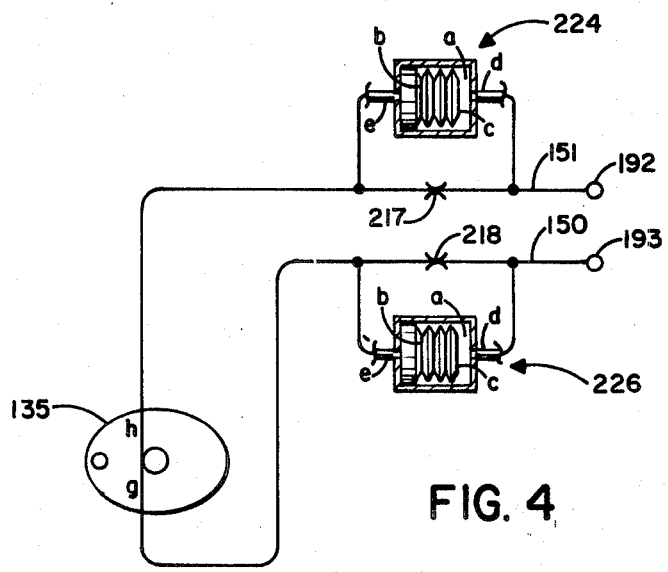
FIG. 4 illustrates a lead lag feedback circuit which might be employed in the apparatus of FIG. 2.

FIG. 4 illustrates a circuit for obtaining feedback lead lag as might also be employed in the servoactuator of FIG. 2. Referring to FIG. 4, a first resistor 217 is introduced into conduit 151, and a second resistor 218 is introduced into conduit 150. A first bellows capacitor 224 is connected into conduit 151 parallel with resistor 217. That is, a conduit 224d joins conduit 151 between transducer outlet 193 and resistor 217, while a conduit 224e connects conduit 151 between resistor 217 and amplifier feedback control port 135h. Similarly, a second bellows capacitor 226 is connected to conduit 150 in parallel with resistor 218. Capacitors 224 and 226 are similar to the above described capacitors 220 and 222 of FIG. 3.

The operation of this circuit parallels the operation of an electrical high-pass filter. Again consider a step function feedback signal in the sense of increased flow through transducer output port 192 and decreased flow through transducer output port 193. A portion of this fluid feedback signal flows through resistor 217 with a pressure drop determined by the resistance of resistor 217. At the same time, a portion of the impulse passes through conduit 224d into chamber 224a. Bellows 224c responds by contracting to force fluid from chamber 224b through conduit 224e to conduit 151 and ultimately to amplifier control port 135h. When capacitor 224 is charged, that is, when bellows 224c has established a new equilibrium, the entire fluid flow from transducer outlet 192 is again directed through resistor 217, with an accompanying pressure drop across the resistor. The portion of the circuit including conduit 150, resistor 218, and capacitor 226 would perform similarly except in the opposite sense. The reduced flow through conduit 150 would cause bellows 226c to expand to establish a new equilibrium to accomplish the high-pass. Once this equilibrium is established, all fluid exhausting through transducer outlet 193 again flows via conduit 150 through resistor 218 to amplifier control port 135g, again with the accompanying pressure drop across the resistor. Thus, the impulse of the step function will be passed through the capacitors and the ultimate steady state flow will have a pressure drop determined by the resistance of resistors 217 and 218.

It will be seen that I have provided a servoactuator capable of translating low power fluidic control signals directly to proportional high power actuator response without the need for electrical or mechanical interfaces between the fluidic control system and the hydraulic actuator. My servoactuator, using only proportional amplifiers, obtains high gain formerly attainable only by employing spool valves. By eliminating the spool valves, my servoactuator secures this high gain in a more facile, economical, and efficient manner than prior servoactuators.

While I have shown two cascaded proportional fluid amplifiers in the described embodiments, it should be realized that the number of amplifiers used in a particular control application would be dictated by the power amplification required for that application.

I have illustrated two particular flex valves controlling the fluid amplifiers and have illustrated preferred feedback apparatus. However, it should also be realized that other valves and feedback apparatus will perform satisfactorily in the invention.

In addition, although I have described lagged and lead lagged feedback circuits as employed in a particular embodiment of my servoactuator, it is apparent that similar circuits may be employed in other embodiments.

I claim as my invention:

1. A hydraulic fluidic servoactuator consisting essentially of:

fluid servovalve means including proportional fluid amplifier means comprising a power nozzle, a pair of control ports, a pair of outlet passages, an interaction region, and an isolation chamber between the interaction region and the outlet passages, the isolation chamber having a return conduit connected thereto, said fluid servovalve means further including a position command signal input for receiving a fluid position command signal, a force beam and bellows assembly for summing the position command signal and a feedback signal and producing a fluid control signal indicative of the summation, means for conveying said control signal to said fluid amplifier means for amplification thereby, and output means in communication with the outlet passages of said fluid amplifier means;

actuator means in communication with said output means and including a movable member operable to change position in response to fluid signals applied thereto;

feedback means comprising a transducer connected to said actuator for producing fluid feedback signals indicative of the position thereof; and means for conveying the feedback signals to the force beam and bellows assembly.

* * * * *